United States Patent
Moon et al.

(10) Patent No.: US 8,792,897 B2
(45) Date of Patent: Jul. 29, 2014

(54) METHOD FOR TRANSMITTING A SYNCHRONOUS CHANNEL AND AN ESSENTIAL CONTROL INFORMATION CHANNEL, AND FEMTO BASE STATION THEREOF

(75) Inventors: Sung-Ho Moon, Gyeonggi-Do (KR);
Hyun-Woo Lee, Gyeonggi-Do (KR);
Jin-Sam Kwak, Gyeonggi-Do (KR);
Seung-Hee Han, Gyeonggi-Do (KR);
Dong-Cheol Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 13/127,971

(22) PCT Filed: Dec. 4, 2009

(86) PCT No.: PCT/KR2009/007225
§ 371 (c)(1),
(2), (4) Date: May 5, 2011

(87) PCT Pub. No.: WO2010/064865
PCT Pub. Date: Jun. 10, 2010

(65) Prior Publication Data
US 2012/0015645 A1   Jan. 19, 2012

Related U.S. Application Data (60) Provisional application No. 61/120,061, filed on Dec. 5, 2008.

(30) Foreign Application Priority Data

May 25, 2009   (KR) ........................ 10-2009-0045590

(51) Int. Cl.
*H04W 40/00*   (2009.01)

(52) U.S. Cl.
USPC .......................... 455/444; 455/448; 455/449

(58) Field of Classification Search
CPC ... H04W 56/00; H04W 16/32; H04W 56/001; H04W 72/04; H04W 74/002
USPC .......................................... 455/444, 448, 449
See application file for complete search history.

(56) References Cited

U.S. PATENT DOCUMENTS

2008/0244148 A1   10/2008   Nix et al.
2009/0221295 A1*   9/2009   Sahin et al. .................. 455/450

(Continued)

FOREIGN PATENT DOCUMENTS

| CN | 1249887 | 4/2000 |
|---|---|---|
| CN | 101277506 | 10/2008 |
| CN | 101278579 | 10/2008 |

OTHER PUBLICATIONS

Jun-Hyo Shin, et al., "Effective timing synchronization methods for femtocell," Proceedings of the ITFE Summer Conference, Aug. 29, 2008, pp. 237-238.

(Continued)

*Primary Examiner* — Marisol Figueroa
(74) *Attorney, Agent, or Firm* — Lee, Hong, Degerman, Kang & Waimey (57) ABSTRACT

The present invention provides a method for transmitting a synchronous channel and an essential control information channel in a femto base station. The method comprises the steps of: acquiring by the femto base station segment information from a macro base station which overlays the femto base station; discriminating by the femto base station the segment or subcarrier used by the macro base station; and transmitting by the femto base station a synchronous channel and essential control information thereof on the segment or subcarrier different from the segment or subcarrier discriminated in the previous step.

8 Claims, 12 Drawing Sheets

(56) References Cited

U.S. PATENT DOCUMENTS

| | | | |
|---|---|---|---|
| 2010/0111014 A1* | 5/2010 | Kang et al. | 370/329 |
| 2010/0165942 A1* | 7/2010 | Liao et al. | 370/329 |
| 2012/0063403 A1* | 3/2012 | Moon et al. | 370/329 |

OTHER PUBLICATIONS

Jong Shik Lee, et al., "Research on deciding a initial delay for femtocell network synchronization system in ITS," Jul. 2, 2008, pp. 8-11.

Jun-Hyo Shin et al., "Effective timing synchronization methods for femtocell," Journal of Korea Institute of Information and Telecommunications facilities Engineering, pp. 237-241, Aug. 29, 2008.

Lee, Jong Sik et al., "Research on deciding a initial delay for femtocell network synchronization systems in ITS," Trend/Research Report of KT Managements Research Laboratory, pp. 8-11, Jul. 2, 2008.

State Intellectual Property Office of the People's Republic of China Application Serial No. 200980147674.1, Office Action dated Jun. 27, 2013, 5 pages.

* cited by examiner

METHOD FOR TRANSMITTING A SYNCHRONOUS CHANNEL AND AN ESSENTIAL CONTROL INFORMATION CHANNEL, AND FEMTO BASE STATION THEREOF

CROSS-REFERENCE TO RELATED APPLICATIONS

This application is the National Stage filing under 35 U.S.C. 371 of International Application No. PCT/KR2009/007225, filed on Dec. 4, 2009, which claims the benefit of earlier filing date and right of priority to Korean Application No. 10-2009-0045590, filed on May 25, 2009, and also claims the benefit of U.S. Provisional Application Ser. No. 61/120,061, filed on Dec. 5, 2008, the contents of which are all hereby incorporated by reference herein in their entirety.

TECHNICAL FIELD

This specification relates to a femto cell, and more particularly, a method for transmitting a synchronous channel and an essential control information channel in a femto cell.

BACKGROUND ART

Second generation (2G) mobile communication refers to transmission and reception of voice into digital and is represented by Code Division Multiple Access (CDMA), Global System for Mobile communication (GSM) and the like. General Packet Radio Service (GPRS) was evolved from the GSM. The GPRS is a technology for providing a packet switched data service based on the GSP system.

Third Generation (3G) mobile communication refers to transmission and reception of image and data as well as voice (audio). Third Generation Partnership Project (3GPP) has developed a mobile communication system (i.e., International Mobile Telecommunications (IMT-2000)), and adapted Wideband-CDMA (WCDMA) as Radio Access Technology (RAT). The IMT-200 and, the RAT, for example, the WCDMA are called as Universal Mobile Telecommunication System (UMTS) in Europe. Here, UTRAN is an abbreviation of UMTS Terrestrial Radio Access Network.

Meanwhile, the third generation mobile communication is evolving to the fourth generation (4G) mobile communication.

As the 4G mobile communication technologies, a Long-Term Evolution Network (LTE) whose standardization is being carried on in 3GPP and IEEE 802.16 whose standardization is being carried on in IEEE have been introduced. The LTE uses a term 'Evolved-UTRAN (E-UTRAN).'

The 4G mobile communication technology has employed Orthogonal Frequency Division Multiplexing (OFDM)/Orthogonal Frequency Division Multiple Access (OFDMA). The OFDM uses a plurality of orthogonal subcarriers. The OFDM uses an orthogonal property between Inverse Fast Fourier Transform (IFFT) and Fast Fourier Transform (FFT). A transmitter performs the IFFT for data and transmits the data. A receiver performs the FFT for a received signal to recover original data. The transmitter uses the IFFT for concatenating a plurality of subcarriers, and the receiver uses the corresponding FFT to segment the plurality of subcarriers.

The 3G or 4G mobile communication system continuously attempts to increase a cell capacity in order to support high-capacity services and bidirectional services, such as multimedia contents, streaming and the like.

To increase the cell capacity, an approaching has been proposed to use a high frequency band and reduce a cell radius. If a cell with a short radius, such as a pico cell or the like, is applied, use of a frequency band higher than a frequency used in the conventional cellular system is allowed, thereby enabling transfer of more information. However, such structure requires more base stations to be installed in the same area, which disadvantageously causes a cost increase.

Among approaches of using a small cell and increasing a cell capacity, a femtocell has been recently proposed.

A femtocell refers to installing a base station, which is extremely compact in size and uses low power, in a home/business to provide a small wireless environment. The femtocell is expected to enhance service qualities in response to improving an indoor service available area (coverage) and a capacity, and completely establishing the next generation mobile communication system by providing data services.

3GPP WCDMA and LTE Group are undergoing the standardization of the femtocell called 'Home eNodeB' and 3GPP2 is actively undergoing a research for the femtocell.

Figure 1:
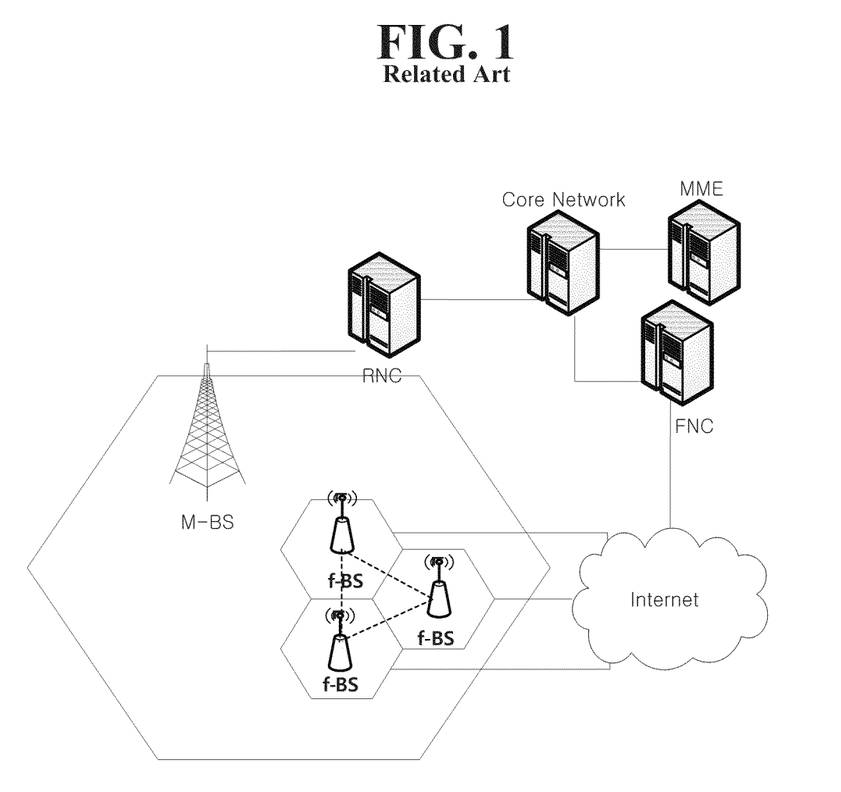
FIG. 1 illustrates an exemplary femtocell-based network structure according to the related art.
Figure 2:
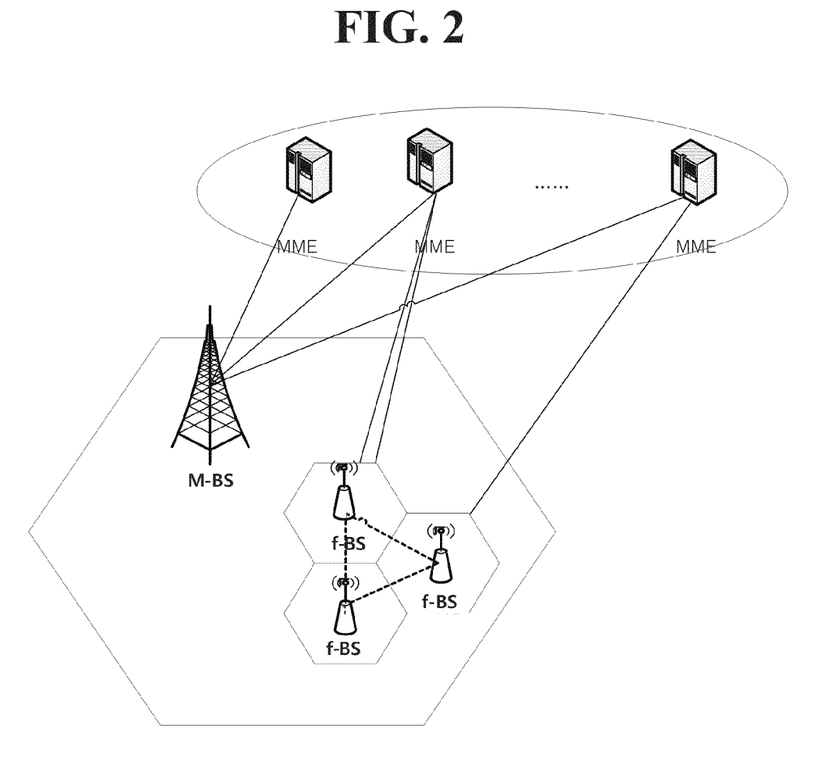
FIG. 2 illustrates another exemplary femtocell-based network structure according to the related art.

Different structures are illustrated in FIGS. 1 and 2 in regard of a method for implementing such femtocell in the conventional mobile communication network.

First, FIG. 1 illustrates an exemplary femtocell-based network structure according to the related art.

As illustrated in FIG. 1, the femtocell-based network includes a macro base station (M-BS) having a broad service coverage, and a plurality of femto base stations (f-BSs) installed based on each user.

The f-BS is connected to a femtocell network controller (FNC) via an Internet and controlled thereby, and provides services to a user.

An MS measures signals of neighboring cells and transfers the measured signals to its f-BS. The f-BS recognizes existence of the neighboring cells based on the transferred signals. Also, the f-BSs exchange information via a direct link or an indirect link, such as the FNC. The f-BS and the M-BS exchange information via the FNC and a Radio Network Controller (RNC) or a Mobility Management Entity (MME), which controls the f-BS in a mobile communication network.

FIG. 2 illustrates another exemplary femtocell-based network structure according to the related art.

As illustrated in FIG. 2, the f-BSs exchange information via a direct link or MME, different from FIG. 1. The M-BS and the f-BS exchange information via the MME.

Figure 3:
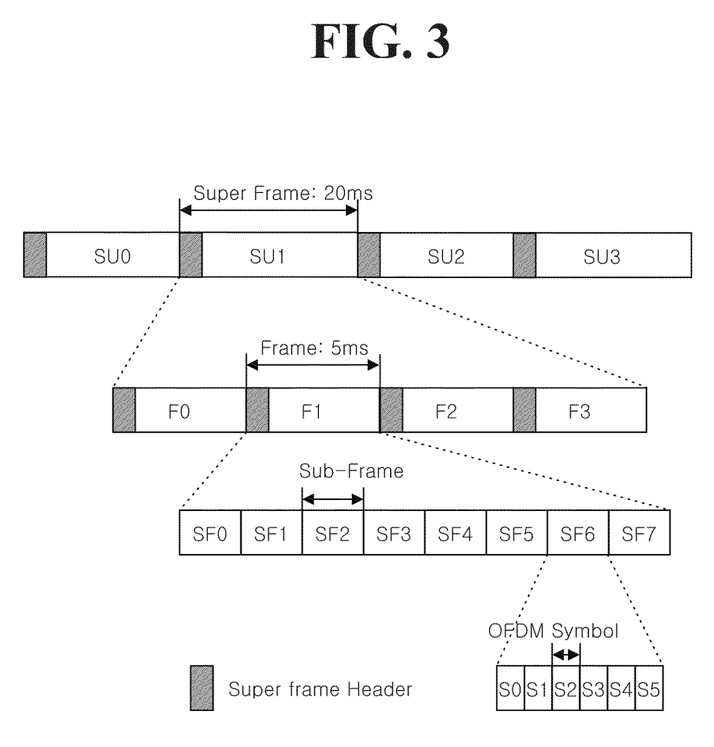
FIG. 3 illustrates an exemplary frame structure used in the femtocell and a macrocell according to the related art.

FIG. 3 illustrates an exemplary frame structure used in the femtocell and a macrocell according to the related art.

As illustrated in FIG. 3, a superframe is segmented into four radio frames each having the same size. The superframe may include a superframe header. The superframe header may include essential control information that an MS should acquire upon an initial network entry or handover, and function similar to a Broadcast Channel (BCH) in the LTE technology. The superframe header may be assigned to a first radio frame of a plurality of radio frames constituting a superframe. The number of subframes constituting one frame may be variable to 5, 6, 7 or 8 depending on a bandwidth of a system or a length of a cyclic prefix (CP), and the number of symbols of OFDMA constituting one subframe may also be variable to 5, 6, 7 or 9. FIG. 3 exemplarily illustrates that the length of CP is ⅛ Tb (Tb: Useful OFDMA symbol time) when a bandwidth is 5, 10 or 20 MHz.

The frame structure exemplarily illustrated in FIG. 3 may be applied to a Time Division Duplexing (TDD) or Frequency Division Duplexing (FDD) scheme. In the TDD, an entire frequency band is used for uplink (UL) or downlink (DL)

transmission but is divided into UL transmission and DL transmission at a time domain. In the FDD scheme, UL transmission and DL transmission occupy different frequency bands and can be simultaneously performed.

Each subframe may be divided into at least one frequency partition. Each frequency partition may include at least one physical resource unit (PRU). Each frequency partition may include a localized PRU and/or a distributed PRU. Each frequency partition may be used for the purpose of a fractional frequency reuse (FFR), for example.

The PRU indicates a basic physical unit for resource allocation, including N consecutive OFDM symbols and P consecutive subcarriers. A logical resource unit (LRU) is a basic logical unit for distributed resource allocation and localized resource allocation. The LRU includes P*N subcarriers. The LRU includes pilots used in the PRU. Hence, an appropriate number of subcarriers in one LRU may be dependent on the number of allocated pilots.

Figure 4:
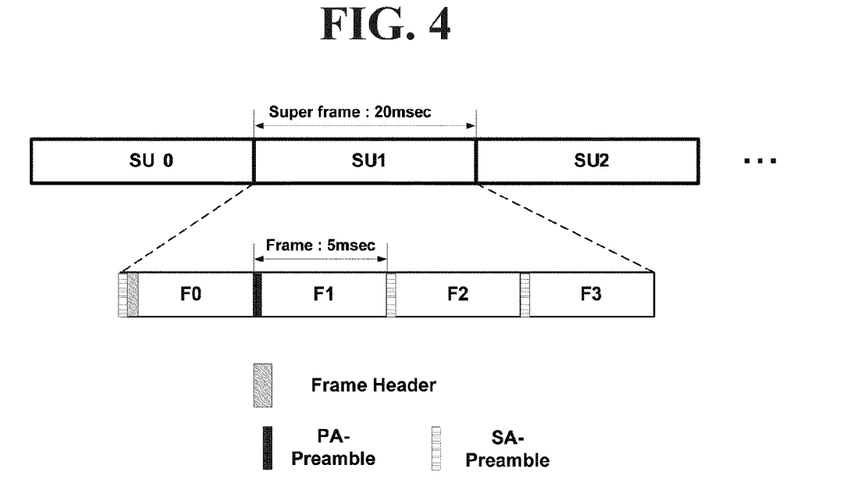
FIG. 4 illustrates a superframe structure according to the related art.

FIG. 4 illustrates a structure of a synchronous channel (hereinafter, referred to as advanced-preamble (A-preamble)) of IEEE 802.16m (or advanced air interface), which is one of the 4G mobile communication systems. 4 primary or secondary preambles each occupying 1 OFDMA symbol are located within a superframe of 20 ms in size. A superframe header (SFH) by which essential control information is transmitted is transmitted after the secondary preamble symbol. Frequency reuse 1 is applied for Primary Advanced preamble (PA-preamble) transmission, and frequency reuse 3 is applied for Secondary Advanced preamble (SA-preamble) transmission. Therefore, for the SA-preamble, segments are allocated by three types of 1-to-1 mapping according to three types of sector indexes. This exemplary embodiment illustrates that the PA-preamble is located at the second frame, but the present disclosure may not be limited to the case that the PA-preamble is located at the first, third or fourth frame.

Figure 5:
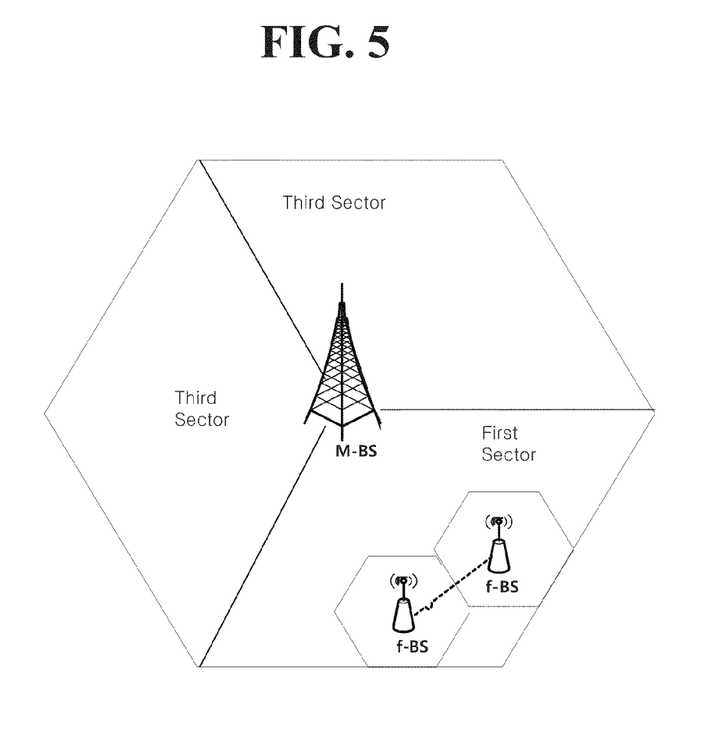
FIG. 5 illustrates an exemplary structure showing a femtocell and a macrocell according to the related art.
Figure 6:
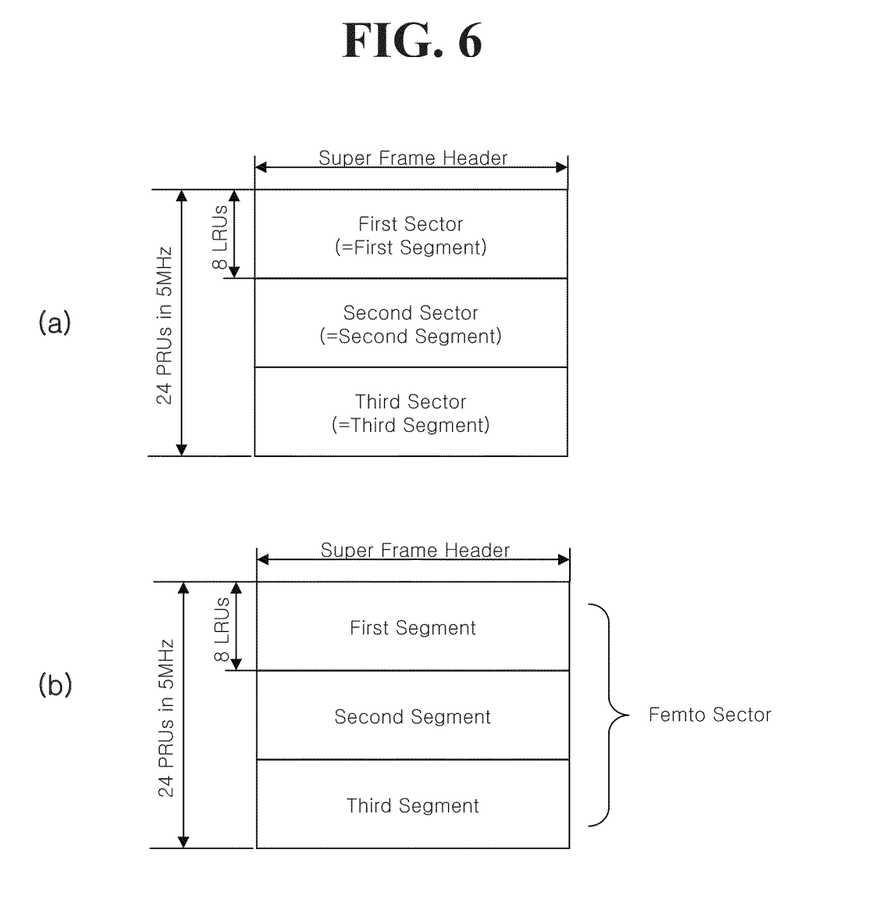
FIG. 6 illustrates exemplary frames of the femtocell and the macrocell.

FIG. 5 illustrates an exemplary structure showing a femtocell and a macrocell according to the related art, and FIG. 6 illustrates exemplary frames of the femtocell and the macrocell.

As illustrated in FIG. 5, a cell located within the coverage of the M-BS includes a plurality of sectors. The sector means an area defined by a directional antenna of the macrocell. The macrocell, as illustrated, may include three sectors. A segment is defined as a set of PRUs. As illustrated in FIG. 6(a), 24 PRUs within 5 MHz may be divided into three segments, and each segment uses 8 LRUs. In general, one segment is configured within one sector by 1-to-1 mapping. However, the number of segments and the number of sectors may be different from each other, and in this case, mapping between the segment and the sector may depend on a provider's cell planning. The present invention has assumed a typical environment of a communication system having three segments and three sectors.

Each femtocell illustrated in FIG. 5 fixedly uses one sector. However, as illustrated in FIG. 6(b), for the femtocell according to this specification, one sector uses one of the three segments, but the one segment is actively decided by the f-BS.

However, as illustrated in FIG. 5, when a femtocell located in the first sector of the macro cell uses the first segment, which is mapped to the first sector of the macrocell, with the macrocell, an interference with the macrocell may be caused.

In particular, the f-BS is installed at a position fixed by a user, so it is difficult to efficiently manage or avoid the interference with the macrocell.

Similarly, an essential control information channel, like a superframe header is not free from such interference. Since the essential control information channel includes information, such as system information, that all terminals can commonly use, the affection by the interference may cause a very severe obstacle at a terminal's initial network entry or handover.

DISCLOSURE OF THE INVENTION

Therefore, an aspect of this specification is to address such drawbacks. That is, an aspect of this specification is to allow an efficient radio resource allocation between a femtocell and a macrocell. In particular, an aspect of this specification is to allow an efficient common control channel allocation between a femtocell and a macrocell. Another aspect of this specification is to efficiently allocate a segment for a synchronous channel (SCH or A-preamble) or an essential control information channel (broadcast channel (BCH) or superframe header (SFH)) of the common control channels.

To achieve these and other advantages and in accordance with the purpose of the present invention, as embodied and broadly described herein, there is provided a femto base station. The femto base station may include a transceiver configured to acquire segment information from a macro base station, the macro base station overlaying the femto base station, and a processor configured to discriminate the segment or subcarrier used by the macro base station, and transmit a synchronous channel and a control channel of the femto base station on the segment or subcarrier different from the discriminated segment or subcarrier via the transceiver. The segment information may be received via a backbone network of the macro base station. Alternatively, the segment information may be acquired by scanning a synchronous channel transmitted by the macro base station.

The segment information of the macro base station may be acquired via Secondary Advanced preamble (SA-preamble) through scanning, or via Primary Advanced preamble (PA-preamble) when sector information is transmitted on the PA-preamble.

The femto base station may be synchronized with the macro base station.

To achieve those aspects of this specification, there is provided a method for transmitting a synchronous channel in a femto base station. The method may include acquiring, by the femto base station segment information from a macro base station which overlays the femto base station, discriminating by the femto base station the segment or subcarrier used by the macro base station, and transmitting by the femto base station a synchronous channel thereof on the segment or subcarrier different from the discriminated segment or subcarrier.

ADVANTAGEOUS EFFECT

This specification may allow an efficient radio resource allocation between a femto cell and a macro cell. Also, this specification may allow an efficient allocation of a common control channel between the femto cell and the macro cell. In addition, an efficient allocation of SA-preamble can be allowed.

MODES FOR CARRYING OUT THE PREFERRED EMBODIMENTS

This specification is applied, but not limited, to a femtocell. This specification may be applicable to any communication system and method to which the technical scope of this specification can be applied.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The term 'terminal' is used herein, but the terminal may be replaced with other terms, such as User Equipment (UE), Mobile Equipment (ME), Mobile Station (MS) and the like. Also, the terminal may be a type of portable equipment, such as a cellular phone, PDA, a smart phone, a notebook and the like, or a type of fixed equipment, such as PC, vehicle-mounted device and the like.

Figure 7:
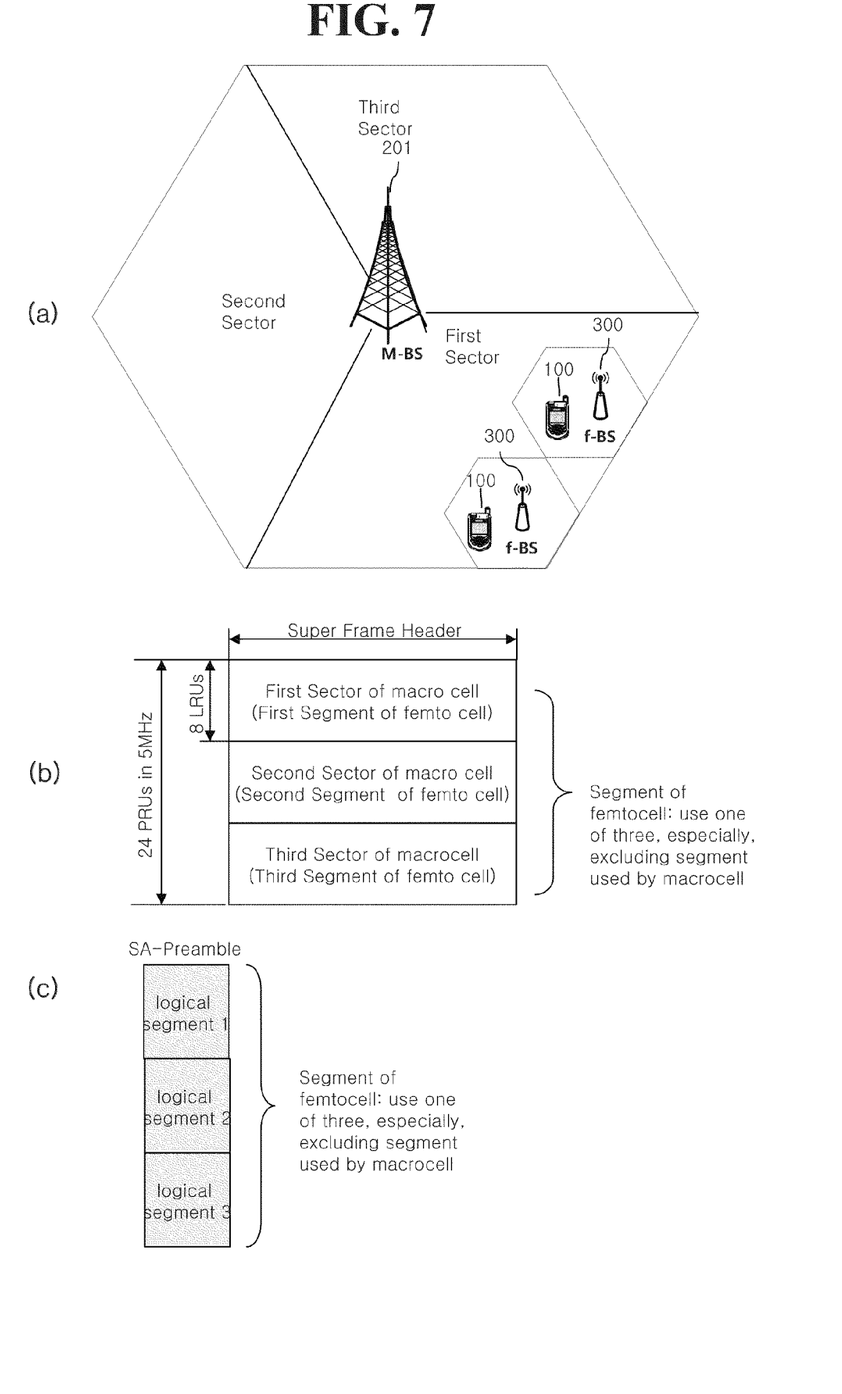
FIG. 7 illustrates exemplary frames of a femtocell and a macrocell in accordance with this specification.

FIG. 7 illustrates exemplary frames of a femtocell and a macrocell in accordance with this specification.

As illustrated in FIG. 7(a), an MS 100 and a first macro BS 201 and one or more femto BSs 300 are illustrated.

A cell of the first macro BS 201 may include three sectors. The femto BSs 300 may be located within the first sector. The femto BSs 300 are installed by a user, so their positions may differ from those illustrated in the drawing.

Here, interference between the macro BS and the femto BS should be avoided. That is, FIG. 7(b) illustrates a superframe header used in each sector of the macro cell.

Referring to FIG. 7(b), the femto BS 300 may use one segment for SA-preamble transmission and SFH transmission. Here, the femto BS may use one appropriate segment of the three segments.

That is, as illustrated, an interference occurs between a superframe header (SFH) used in the first sector of the macro cell and the first segment of the femtocell. Accordingly, the femto BS may preferably use a segment excluding the first segment. Such scheme of using a segment for avoiding the interference may preferably be applied to a common control channel.

The common control channel may include a synchronous channel (SCH) and a broadcast channel (BCH). The SCH may include a primary-SCH (P-SCH) and a secondary-SCH (S-SCH). The SCH is called differently in each technology in the 4G mobile communication technology. For example, it is called as a synchronization signal (SS) in LTE, and a preamble in IEEE 802.16e. Also, it is called as an advanced-preamble or A-preamble in Advanced Air Interface (AAIF) of IEEE 802.16m. Here, the A-preambles may be divided into a primary advanced preamble (PA-preamble) and a secondary advanced preamble (SA-preamble). The BCH may be called as a superframe header in IEEE 802.16m. Hereinafter, the SCH indicates all of preamble or A-preamble and also the BCH indicates the superframe header.

The PA-preamble may allow partial transmission of transmission band, base station type, sector information or cell ID grouping information. The SA-preamble (secondary-Sync channel) may be used for cell ID transmission.

That is, the sector information of the macrocell and sector information of the femtocell may be indicated by the PA-preamble. For example, two bits of the PA-preamble may indicate three macro sectors and one femto sector. Also, a PA-preamble transmitted from the macro BS may indicate a type of the macro BS, and a PA-preamble transmitted from the femto BS may indicate a type of the femto BS. PA-preambles transmitted from the macro BS and the femto BS may indicate bandwidths used in the macro BS and the femto BS.

As another example, a case where a PA-preamble transmits only a bandwidth may be regarded. That is, information related to a sector may not be included in the PA-preamble. In this case, information related to a sector and a segment that the macro BS is using for transmission may be acquired from a cell ID obtained from SA-preamble.

As such, the PA-preamble, the SA-preamble and the SFH are required to be appropriately allocated between the first macro BS 201 and the femto BS 300. Hereinafter, it will be described.

First, explaining the PA-preamble, the first macro BS 201 transmits corresponding sector information related to the macro BS 201 on the PA-preamble. Alternatively, non-existence of the sector information on the PA-preamble may also be considered.

The femto BS 300 may scan the sector information transmitted from the first macro BS 201 on the PA-preamble and receive it. Alternatively, if the sector information is not transmitted on the PA-preamble, the femto macro BS 300 may acquire the sector information that a donor macro BS uses based on a cell ID obtained from the SA-preamble.

Without the scanning, the femto BS 300 may be connected directly to a backbone network of the first macro BS 201 or to the first macro BS 201 via a core network so as to receive the sector information related to the macro BS (or donor BS).

Without the scanning, the femto BS 300 may acquire sector or segment information included in the SFH of the first macro BS 201.

The femto BS 300 may transmit the same sector information of the macro BS (or donor BS) covering its coverage on the PA-preamble. Here, it is assumed that the sector information is transmitted on the PA-preamble. If the sector information is not transmitted on the PA-preamble, the femto BS 300 does not transmit the sector information on the PA-preamble either. That is, the PA-preamble structure of the femto BS 300 is the same as that of the first macro BS 201. Consequently, the femto BS 300 may transmit the sector information of the donor macro BS on the PA-preamble to obtain a diversity effect.

Alternatively, the femto BS 300 may transmit its own sector information, other than the sector information of the donor BS, on the PA-preamble.

Next, explaining the SA-preamble and the SFH, the first macro BS 201 may transmit SFH information on a segment corresponding to a transmission sector and SA-preamble carrying cell ID information on a SA-preamble segment corresponding to a transmission sector. Here, a physical segment for SFH transmission and a physical segment for SA-preamble transmission may be different from each other.

The femto BS 300 may transmit cell ID information on SA-preamble of another segment, based on the sector information of the first macro BS 201, which was acquired through the aforesaid scanning or non-scanning. This is to reduce an affection of interference by differing the sector within the first macro BS 201 from the segment of the femto BS 300 (namely, in FIG. 7, the femto BS is located within the first sector of the macro BS, so the second segment and the third segment are less affected by interference).

An approach that after acquiring two highly interfered segments through scanning or a scheme other than the scanning, the femto BS 300 transmits SFH and SA-preamble through another segment other than the acquired two segments. Here, the two highly interfered segments may be a donor macro BS or another neighboring macro BS, or be a donor macro BS and a neighboring femtocell.

Another approach may be considered in which SFH is transmitted without being segmented and SA-preamble is transmitted by being segmented.

However, the femto BS 300 may transmit its cell ID on the SA-preamble of the same segment as the sector within the first macro BS 201.

Hereinafter, a BCH will be described with reference to FIG. 8.

Figure 8:
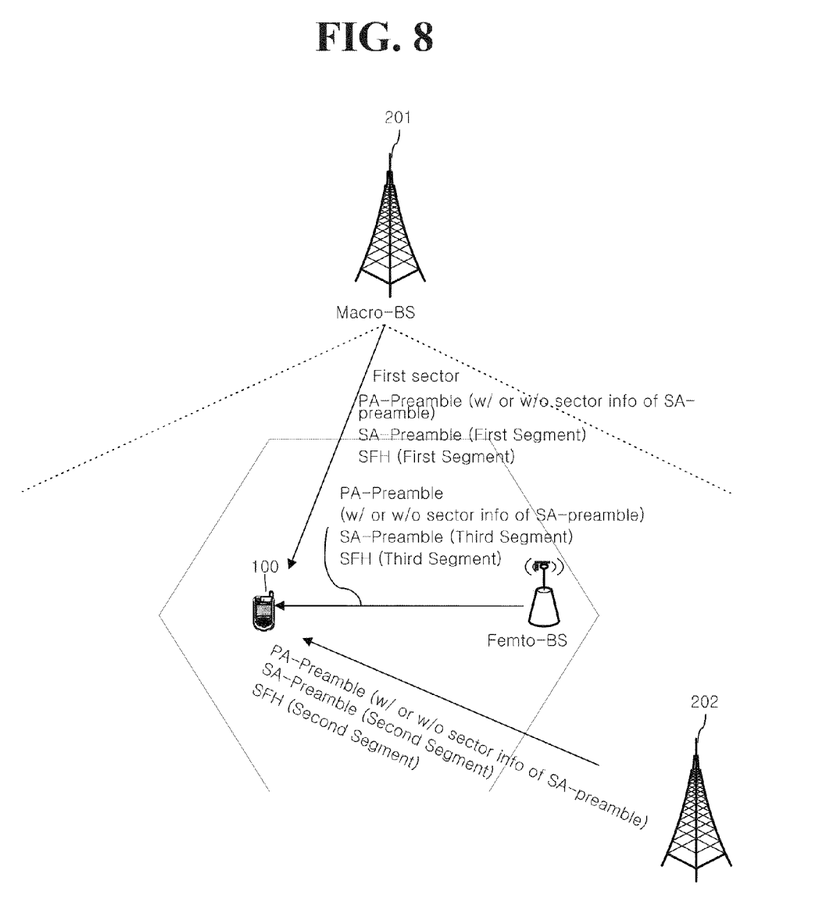
FIG. 8 illustrates an exemplary relationship between broadcast channels of the femtocell and the macrocell.

FIG. 8 illustrates an exemplary relationship between broadcast channels of the femtocell and the macrocell.

FIG. 8 illustrates an example for avoiding interference between SFH and SA-preamble channel among the first macro BS 201, a second macro BS 202 and the femto BS 300. In this example, two BSs causing the highest interference may be the first macro BS 201 as the donor BS and the neighboring second macro BS 202.

Figure 9:
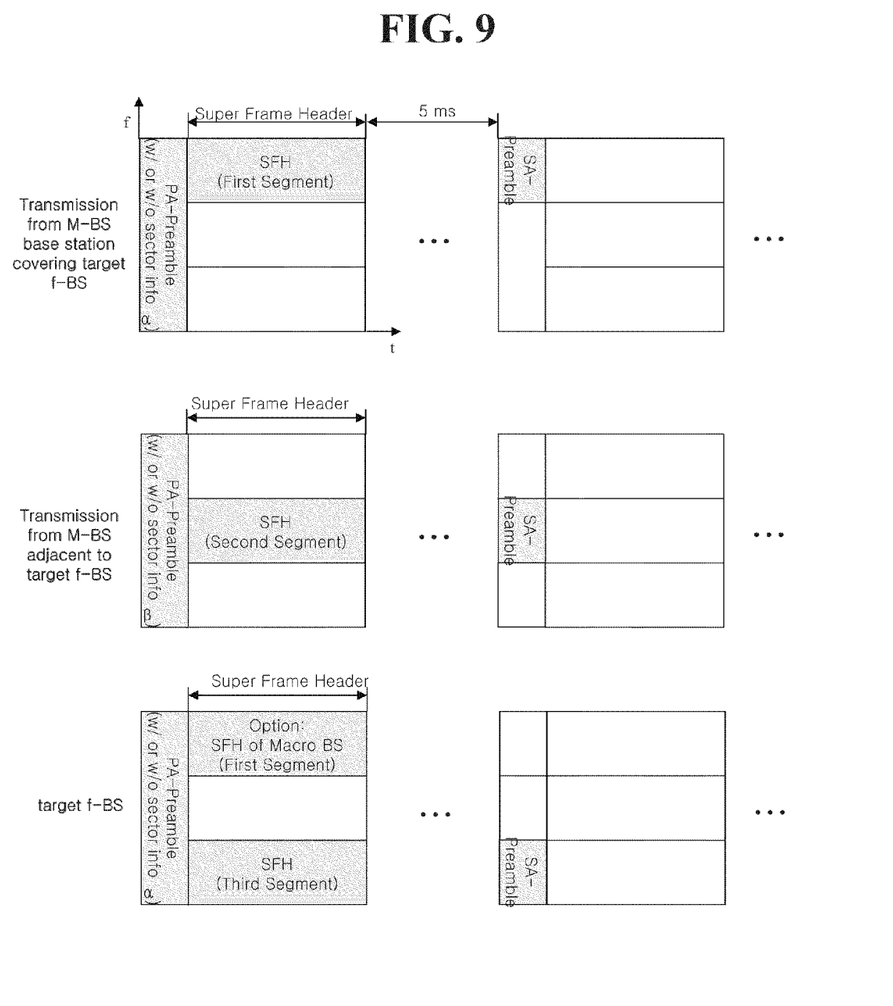
FIG. 9 illustrates a frame structure in accordance with one exemplary embodiment.
Figure 10:
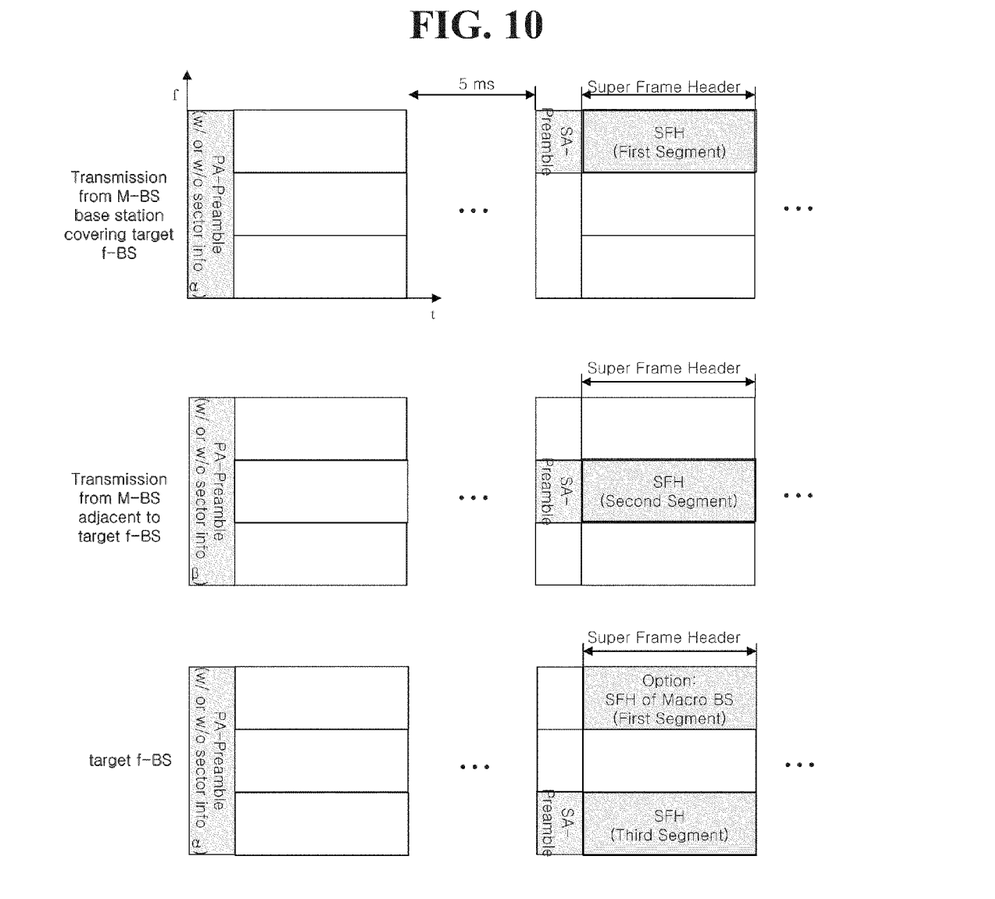
FIG. 10 illustrates a frame structure in accordance with another exemplary embodiment.

FIGS. 9 and 10 illustrate exemplary frame structures according to this specification.

Prior to explanation with reference to FIG. 9, it is assumed that the first macro BS 201 and the femto BS 300 are located as illustrated in FIG. 7(*a*).

Referring to FIG. 9, the first donor macro BS 201 transmits PA-preamble (PA-preamble (/w or w/o sector info. α in FIG. 9) for a first sector on every PRU in a frequency axis and on the first subframe (or part of symbols) in a time axis on a superframe. The first macro BS 201 then transmits SFH on a first segment for the first sector. The first macro BS 201 transmits SA-preamble on the first segment, which is segmented for the SA-preamble (here, the segment for SFH and the segment for SA-preamble are different physically and merely the same logically).

FIG. 10 illustrates an example that the SFH transmission is not performed in the same frame as the PA-preamble, but performed in the same frame as the SA-preamble. Similar to the explanation of FIG. 9, the first macro BS 201 transmits the SFH on the first segment for the first sector. The first macro BS 201 then transmits the SA-preamble on the first segment, which is segmented for the SA-preamble (here, the segment for SFH and the segment for SA-preamble are different physically and merely the same logically).

In the meantime, the second macro BS 202 adjacent to a target femtocell transmits PA-preamble (P-SCH (/w or w/o sector info. β in FIG. 9) for the second sector. The second macro BS 202 then transmits SFH for the second sector on the second segment for SFH. The second macro BS 202 transmits SA-preamble on the second segment, which is segmented for the SA-preamble (here, the segment for SFH and the segment for SA-preamble are different physically and merely the same logically).

Regarding still another case, description will be made under assumption that the femto BS 300, as illustrated in FIG. 7(*a*), is located within the first sector of the first macro BS 201.

The femto BS 300 transmits PA-preamble having the same sector information as that of the donor first macro BS 201. The femto BS 300 then transmits its SFH on the third segment on the superframe to avoid interference from SFHs of the donor first macro BS 201 and the neighboring second macro BS 202. Here, optionally, the femto BS 300 may transmit SFH of the first sector of the donor first macro BS 201, to which it belongs, on the first segment. The femto BS 300 then transmits SA-preamble on the third segment to avoid interference from SA-preambles of the donor first macro BS 201 and the neighboring second macro BS 202, among the segments segmented for the SA-preamble (here, the segment for SFH and the segment for SA-preamble are different physically and merely the same logically).

Figure 11:
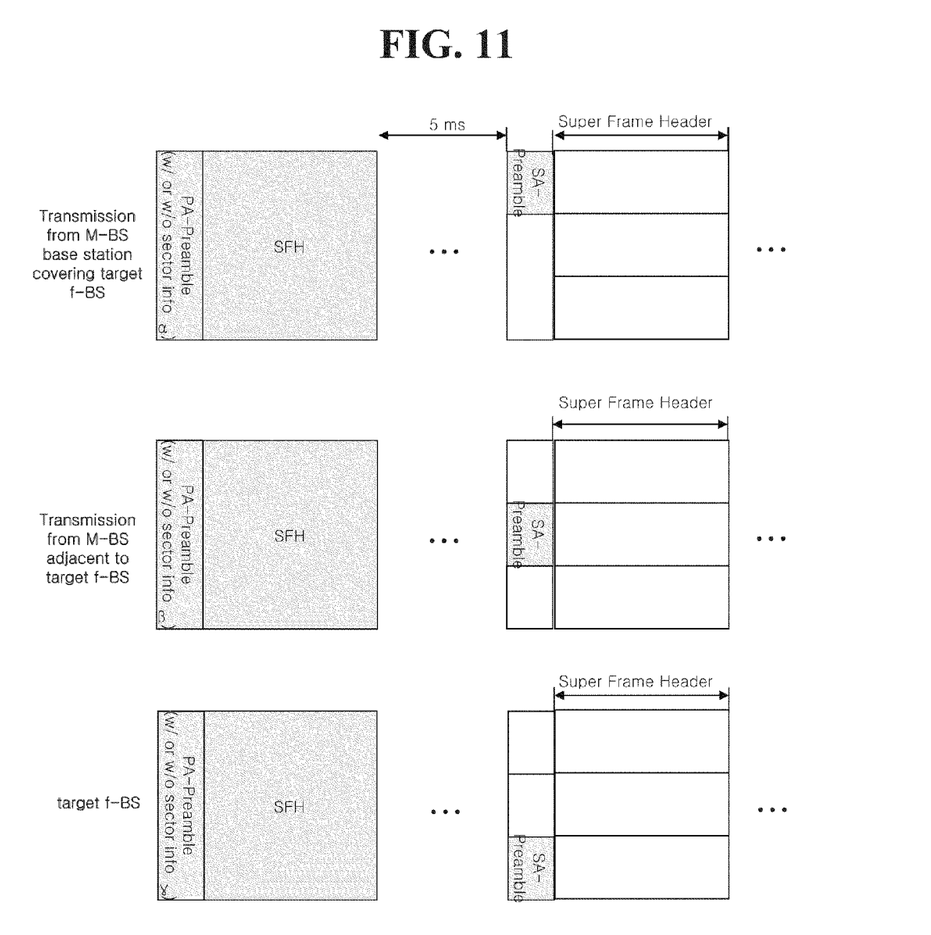
FIG. 11 illustrates a frame structure in accordance with another exemplary embodiment.
Figure 12:
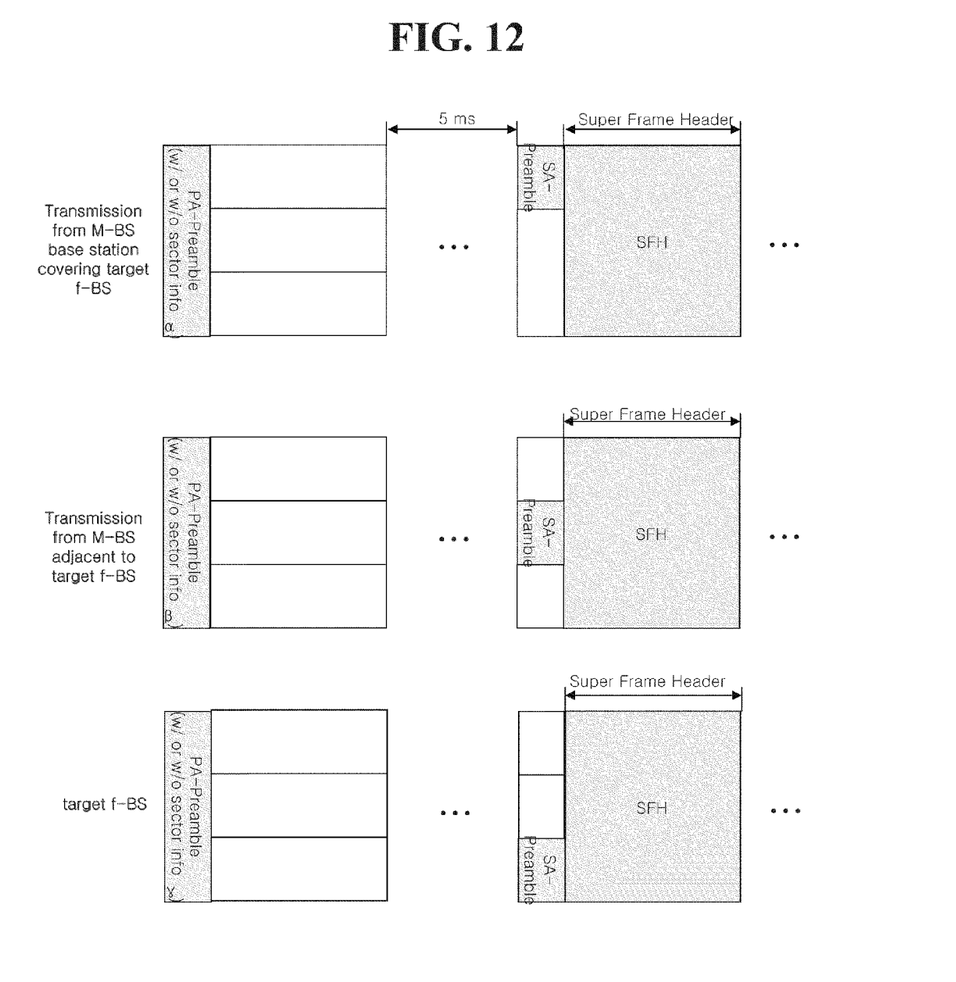
FIG. 12 illustrates a frame structure in accordance with another exemplary embodiment.

FIGS. 11 and 12 illustrate frame structures in accordance with another exemplary embodiments. The frame structures of FIGS. 11 and 12 are different in view of the position of the SFH.

Referring to FIG. 11, according to the another exemplary embodiments, SFH may use every PRUs in the frequency axis on the superframe, unlike the exemplary embodiments of FIGS. 9 and 10. In this case, the part corresponding to the SA-preamble of the explanation given with reference to FIGS. 9 and 10 may be equally applied.

The method according to the present disclosure, as described so far, can be implemented by hardware or software, or any combination thereof. For example, the method according to the present disclosure may be stored in a storage medium (e.g., a memory, a hard disc, etc.). Alternatively, the method according to the present disclosure can be implemented as codes or command words within a software program capable of being executed by a processor.

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A method for transmitting a Super Frame Header (SFH), a Primary Advanced preamble (PA-preamble) and a Secondary Advanced preamble (SA-preamble) in a femto base station, the method comprising:

obtaining segment information from a macro base station which overlays the femto base station;

identifying a subcarrier set for the SA-preamble used by the macro base station based on the segment information;

transmitting the SA-preamble indicating a cell identity of the femto base station on the subcarrier set for the SA-preamble different from the identified subcarrier set for the SA-preamble used by the macro base station;

transmitting the SFH including essential control information on predefined frequency band regardless of the identified subcarrier set for the SA-preamble; and transmitting the PA-preamble including information of system bandwidth on the subcarrier set for the PA-preamble, wherein the subcarrier set for the PA-preamble of the femto base station is the same as that of the macro base station.

2. The method of claim 1, wherein obtaining the segment information comprises receiving the segment information is received via a backbone network of the macro base station.

3. The method of claim 1, wherein obtaining the segment information comprises scanning at least one SA-preamble transmitted by the macro base station.

4. The method of claim 1, wherein the femto base station and the macro base station are synchronized with each other.

5. A femto base station comprising:

a transceiver configured to obtain segment information from a macro base station, the macro base station overlaying the femto base station; and a processor configured to identify a subcarrier set for the SA-preamble used by the macro base station based on the segment information, transmit a Secondary Advanced preamble (SA-preamble) indicating a cell identity of the femto base station on the subcarrier set for the SA-preamble different from the identified subcarrier set for the SA-preamble used by the macro base station, transmit a Super Frame Header (SFH) including essential control information on predefined frequency band regardless of the identified subcarrier set for the SA-preamble, and transmit a Primary Advanced preamble (PA-preamble) including information of system bandwidth on the subcarrier set for the PA-preamble, wherein the subcarrier set for the PA-preamble of the femto base station is the same as that of the macro base station.

6. The femto base station of claim 5, wherein the segment information is received via a backbone network of the macro base station.

7. The femto base station of claim 5, wherein the segment information is obtained by scanning at least one SA-preamble transmitted by the macro base station.

8. The femto base station of claim 5, wherein the femto base station is synchronized with the macro base station.

* * * * *